United States Patent [19]

Young, Jr.

[11] 3,841,773
[45] Oct. 15, 1974

[54] RELEASABLE CONNECTOR SUBASSEMBLY

[75] Inventor: Don L. Young, Jr., Florissant, Mo.

[73] Assignee: The United States of America as represented by the Secretary of the Air Force, Washington, D.C.

[22] Filed: Sept. 13, 1972

[21] Appl. No.: 288,818

[52] U.S. Cl. ............................. 403/341, 403/165
[51] Int. Cl. ............................................ F16c 19/00
[58] Field of Search ........... 403/341, 316, 317, 318, 403/339, 379, 164, 165, 78, 348, 360

[56] References Cited
UNITED STATES PATENTS

| | | | |
|---|---|---|---|
| 1,250,509 | 12/1917 | Rigby | 403/164 |
| 2,548,089 | 4/1951 | Wycosky | 403/341 X |
| 2,863,685 | 12/1958 | Boyce | 403/341 X |

Primary Examiner—Jordan Franklin
Assistant Examiner—Peter Nerbun
Attorney, Agent, or Firm—Harry A. Herbert, Jr.; Arsen Tashjian

[57] ABSTRACT

A releasable connector subassembly adapted for use as part of a load-transmitting control assembly in a high density vehicle, such as an aircraft. The preferred embodiment, in such an adaptation, includes: a first control rod section having a first end to which is attached an eye bolt, and having a second end to which is attached a male-configurated member; an aligned second control rod section having a first end to which is attached a cable or the like, and having a second end to which is attached a female-configurated member releasably engaging and mating with the male member of the first control rod section and thereby forming a joint, and also having an external surface with a peripheral groove therein; a slideably movable tube-like sleeve with a suitably located notch therein and therethrough, with the sleeve removably fitted on and over, and peripherally surrounding and abutting the joint, and with the notch of the sleeve in registration with and abutting the peripheral groove of the second control rod end portion; a slideably movable collar with a longitudinal passageway therethrough and with a transverse passageway therethrough, with the collar and its longitudinal passageway removably fitted on and over, and peripherally surrounding and abutting the sleeve; a bolt, with a cylindrical shaped spacer on the shank portion thereof, passing into, through, and out of the transverse passageway of the collar, and with the spacer abutting the sleeve at the notch therein and also abutting the peripheral groove in the second control rod section; and, a nut threadedly and removably engaged with the bolt. The sleeve is thereby releasably secured to the joint; and, nevertheless, the second control rod section may be rotated within the collar. My preferred embodiment may be rapidly and easily assembled and disassembled within a high density vehicle. Additionally, the preferred embodiment, or any member thereof, also may be rapidly and easily installed, removed and/or replaced, connected, disconnected, and re-connected within the very limited confines of a high density vehicle.

1 Claim, 1 Drawing Figure

PATENTED OCT 15 1974 3,841,773
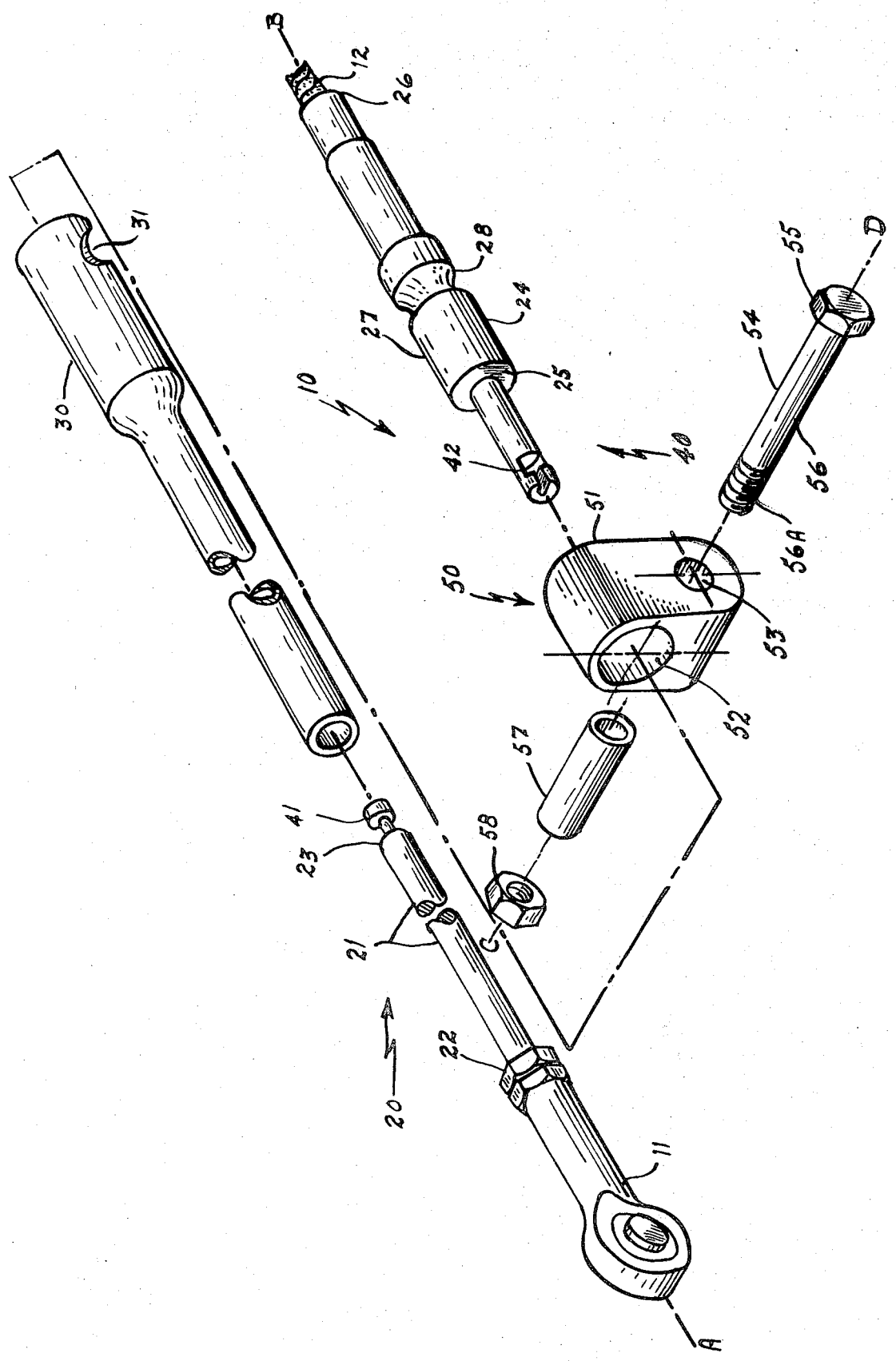

RELEASABLE CONNECTOR SUBASSEMBLY

BACKGROUND OF THE INVENTION

This invention relates to a coupling-like apparatus and, more particularly, to a releasable connecting-type thereof.

As a preliminary matter, it is to be noted that my invention will be shown and described herein with regard to a preferred embodiment which is adapted for use in conjunction with and/or as part of control assemblies, irrespective of whether said control assemblies are of the flexible or rigid type, and, more specifically, as adapted for use with the typical rigid end fitting of such a control. It is here stated and emphasized that the preferred embodiment which is shown and is described herein is solely by way of illustration, and is not by way of any limitation of my invention. It is also to be noted that, as a matter of preference, the embodiment selected for disclosure herein is exceptionally wellsuited for use in high density vehicles, i.e., vehicles, such as an aircraft, where space is limited and is at a premium, and where the conventional load-transmitting control assembly, or more accurately the typical rigid end fitting thereof, must be frequently installed, connected, disconnected, disassembled, re-connected, or removed and/or replaced, since there is a recognized and continuing need in that field for a releasable connecting-type coupling-like apparatus which functionally fulfills certain objects which will be later discussed herein.

It is well known in the aircraft art that the overall length of the typical end fitting of a conventional load-transmitting control assembly, coupled with the rigidity of the end fitting as a whole and of the control rod portion or component thereof in particular, and further coupled with the usual and/or necessary length of the stroke, i.e., the lateral movement, make the installing, disassembling, removing and/or replacing of the end fitting, and also make the connecting, disconnecting, and reconnecting of the rigid one-piece control rod portion thereof, always inconvenient and time-consuming at best, and, in addition, troublesome quite often.

Experience with, and analysis of, the problem clearly establish that what is needed, and is not presently available, in the art is an end fitting, or a component or components thereof, such as a control rod portion, which will permit the easy and rapid installation, disassembly, removal and/or replacement of the end fitting, and which also will permit the easy and rapid connection, disconnection, and re-connection of the control rod portion.

I have invented such an apparatus, which I refer to as a releasable connector subassembly, which fulfills this need; and, I have, thereby, significantly advanced the state-of-the-art.

SUMMARY OF THE INVENTION

This invention pertains to a releasable connector subassembly in an adaption for use as part of a load-transmitting control assembly in a high density vehicle, such as an aircraft.

Therefore, the principal object of this invention is to provide a releasable connector subassembly which will permit the easy and rapid installation, disassembly, removal and/or replacement of the end fitting of a load-transmitting control assembly in such a high density environment, and which also will permit the easy and rapid connection, disconnection, and reconnection of the control rod portion of the end fitting in that same environment.

This object, and other related and equally important objects, of this invention will become readily apparent after a consideration of the description of my invention and reference to the drawing.

DESCRIPTION OF THE DRAWING

The DRAWING is an exploded view, in perspective, partially in schematic form, and partially fragmented of a preferred embodiment of my invention.

DESCRIPTION OF THE PREFERRED EMBODIMENT

With reference to the drawing, therein is shown, in pertinent part, a load-transmitting control assembly 10 which includes, as a component thereof, a preferred embodiment 20 of my invention.

The load-transmitting control assembly 10 includes: an eye bolt (or "head", as it is often referred to in the art) 11, which is configurated to be connected to a means, such as a lever (not shown), to actuate the push-pull remote control linkage system of which the control assembly 10 is a principal component; my preferred embodiment 20 which, as previously stated, I refer to as a "releasable connector subassembly;" and a cable 12 which is attached to, and leads from, an end of a component of my preferred embodiment, and which is connected at its other end (not shown) to a control (not shown) which is to be remotely actuated.

It is to be noted that the eye bolt (or "head") 11, or its equivalent, and a rigid control rod, or its equivalent, such as my preferred embodiment 20, are referred to in the load-transmitting control assembly art as the, or as an, "end fitting". However, the term "end fitting", as herein, is not intended to be so limited, but rather is intended to include any assembly, or the like, where my invention may be used individually, or as a component subassembly of the assembly, such as the load-transmitting control assembly above-mentioned.

The preferred embodiment 20 of my releasable connector subassembly includes, broadly speaking: a first control rod section 21 having a first end 22 to which the head 11 is attached; a second control rod section 24 aligned with the first control rod section 21, and having a first end 25 and a second end 26, and also having an external surface 27 with a peripheral (i.e., in this case, a circumferential) groove 28 therein; means for releasably engaging the second end 23 of the first control rod section 21 with the first end 25 of the second control rod section 24, to form a joint; a sleeve member 30, essentially in the form of a tube with a suitably located notch 31 therein and therethrough, which said sleeve 30 is slidably movable on, and is removably fitted on and over, and is peripherally surrounding the joint which is formed by the releasably engaged second end 23 of the first control rod section 21 and first end 25 of the second control rod section 24; and, means for releasably securing the sleeve member 30 to the joint formed by the releasably engaged second end 23 and first end 25.

More specifically, the means for releasably engaging the second end 23 of the first control rod section 21 with the first end of the second control rod section 24, to form a joint, is generally designated in the drawing as 40. One form of said means 40 may include: a male member, such as 41, attached to the second end 23 of the first control rod section 21; and, a female member, such as 42, attached to the first end 25 of the second control rod section 24, with the said female member 42 shaped and dimensioned to accept, and to releasably engage and mate with the said male member 41. Another form of a suitable means, equivalent to 40, may include a male member, such as 41 described above, attached to the first end 25 of the second control rod section 24, and a female member, such as the above-described 42, attached to the second end 23 of the first control rod section 21. In either means, the male member may be, but need not be, substantially T-shaped, as shown in the drawing, and such shape is preferred.

Also, more specifically, the means for releasably securing sleeve member 30 to the joint formed by the releasably engaged second end 23 and first end 25 is generally designated in the drawing as 50. A preferred structure of said means to includes: a collar 51 with a longitudinal passageway 52 therethrough, and with a transverse passageway 53 therethrough; a bolt 54 having a head 55, and having a shank portion 56 with a far end 56A which is threaded; a spacer 57, preferably in the form of a right circular cylinder, which fits over the shank portion 56 of bolt 54, and which fits into the transverse passageway 53 of collar 51; and a nut 58 which is internally threaded and can be threadedly and removably engaged with the threaded far end 56A of shank 56 of bolt 54.

Collar 51 is slideably movable on, and the longitudinal passageway thereof 52, can be removably fitted on and over, and can peripherally surround and abut sleeve 30 (and, indirectly, the joint formed by releasably engaged members 41 and 42). Bolt 54 is of such dimensions that the shank portion thereof 56 can pass in, through, and out of transverse passageway 53, with the threaded far end 56A of shank 56 protruding from the transverse passageway 53. The spacer 57 is of a length to fit over and cover only the unthreaded portion of shank 56 of bolt 54 (i.e., the spacer does not cover any part of the threaded far end 56A of shank 56).

Also shown in the drawing are longitudinal axis A-B and transverse axis C-D. In this regard, it is to be noted that eye bolt 11, first control rod section 21, sleeve 30, second control rod section 24, and collar 51 each have a longitudinal axis; that said longitudinal axes are coincident; and that the resultant coincident axis is A-B. It is also to be noted that bolt 54, spacer 57, and nut 58 each have a longitudinal axis; that their respective longitudinal axes are coincident; that the resultant coincident axis is C-D; and, that axis C-D and axis A-B are orthogonal and, therefore, in the interest of avoiding confusion, axis C-D will be referred to hereinafter as transverse axis C-D. It is further to be noted that collar 51 has a transverse axis which passes through the geometric center of transverse passageway 53 and is coincident with transverse axis C-D.

MODE OF OPERATION OF THE PREFERRED EMBODIMENT

The assembly, disassembly, and mode of operation of my inventive apparatus is self-evident and is easily understood from the foregoing description of the preferred embodiment 20, coupled with reference to the drawing.

Succintly, sleeve 30 is slipped over first control rod section 21; collar 51, by use of longitudinal passageway 52 thereof, is fitted on sleeve 30; the second end 23 of the first control rod section 21 and the first end 25 of the second control rod section 24 are releasably engaged by suitable means, such as 40, and a joint is thereby formed; sleeve 30 is slid on, and is removably fitted on and over the joint, so that it (30) peripherally surrounds and abuts the joint, with the result that the engaged first and second control rod sections 21 and 24 cannot be disengaged from each other while the sleeve 30 surrounds and abuts the joint, and additionally sleeve 30 is also simultaneously positioned so that notch 31 is in registration with and abuts peripheral groove 28 of second control rod section 24; collar 51, through longitudinal passageway 52, is slid on and is removably fitted on and over, the sleeve 30, so that it (51) peripherally surrounds and abuts the sleeve 30 (and indirectly the joint, which is surrounded by sleeve 30), and so that transverse passageway 53 is in registration with and abuts peripheral groove 28; sleeve 30 is rotated so that notch 31 is in registration with transverse passageway 53 and is still in registration with peripheral groove 28; shank portion 56 is passed, far end 56A first, into, through, and out of transverse passageway 53, with the threaded far end 56A protruding from the transverse passageway 53; spacer 57 is removably fitted over the shank 56 of bolt 54 by insertion into transverse passageway 53 of collar 51, and is interposed between shank 56 and transverse passageway 53, and also is positioned so that the threaded far end 56A of shank 56 is exposed, and so that the spacer 57 abuts the sleeve 30 at the notch 31 and also abuts the external surface 27 of the second control rod section 24 at the peripheral groove 28 therein; and, nut 58 is then threadedly and removably engaged with the threaded far end 56A of shank 56 of bolt 54. My preferred embodiment 20 is thereby assembled, with the inventive result that sleeve member 30 is releasably secured to the joint; and, concurrently, the preferred embodiment permits the second control rod section 24 to rotate within sleeve 30 (and, indirectly, within collar 51).

To disassemble the preferred embodiment 20, the assembly procedure is reversed. Both assembly and disassembly may be performed easily and quickly in a high density vehicle.

As a related matter, it is clearly evident that my preferred embodiment 20, or any member thereof (and, in addition the eye bolt 11), also may be rapidly and easily installed, removed and/or replaced, connected, disconnected, and re-connected within the limited confines of a high density vehicle.

The objects of my invention are, therefore, attained; and, a long sought goal in the art is, thereby, achieved.

CONCLUSION

While there have been shown and described the fundamental features of my invention, as applied to a preferred embodiment adapted for a particular use, it is to be understood that various substitutions, omissions, additions, and adaptations may be made by those of ordinary skill in the art without departing from the spirit of my invention. For example, my inventive concept obviously can be used, or can readily be adapted to be used, to releasably engage, connect, and the like, any two rods, bars, shafts, and the like, and is particularly useful where space is limited.

What is claimed is:

1. A releasable connector subassembly, adapted for use in easily and rapidly disconnecting a load-transmitting control assembly in a high density vehicle, wherein said control assembly includes an end fitting having a control rod portion which, in turn, includes a first control rod section having a first end and a second end, and an aligned second control rod section having a first end and a second end and also having an external surface with a peripheral groove therein, with said second end of the first control rod section and said first end of the second rod control section to be releasably engaged, comprising:

a. means for releasably engaging said second end of said first control rod section with said first end of said second rod control section, and with said second end of said first control rod section releasably engaged with said first end of said second control rod section, whereby a joint is formed;

b. a sleeve member, essentially in the form of a tube with a suitably located notch therein and therethrough, with said sleeve member slideably movable on, and removably fitted on and over, and peripherally surrounding and abutting the joint formed by the releasably engaged said first control rod section and said second control rod section, whereby when said sleeve member is in such a peripherally surrounding and abutting position, said engaged first and second control rod sections cannot be disengaged from each other;

c. and, means for releasably securing said sleeve member to said joint, wherein said means includes:

1. a collar with longitudinal passageway therethrough, slideably movable on, and removably fitted on and over, and peripherally surrounding and abutting said sleeve and indirectly surrounding said joint, and with said collar also having a transverse passageway therethrough;
   2. a bolt having a head and a shank portion with a far end which is threaded, and with said shank portion passing into, through, and out of the transverse passageway in said collar, with said threaded far end of said shank protruding from said transverse passageway of said collar;
   3. a spacer, in the form of a right circular cylinder, removably fitted over and abutting with said shank portion of said bolt, and with said spacer interposed between said shank portion and said transverse passageway of said collar;
   4. and, a nut threadedly and removably engaged with said threaded far end of the shank portion of said bolt;

whereby said spacer abuts said sleeve member at the notch thereof, and also abuts the external surface of the said second control rod section at the peripheral groove therein, thereby releasably securing said sleeve member to said joint and concurrently permitting said second control rod section to rotate within said sleeve.

* * * * *